(12) United States Patent
Mechelaere et al.

(10) Patent No.: US 6,849,313 B2
(45) Date of Patent: Feb. 1, 2005

(54) POLYOLEFIN COMPOSITIONS FOR HEAT-SEALABLE FILMS HAVING CONTROLLED PEEL STRENGTH

(75) Inventors: Martine Mechelaere, Bruges (BE); Ralf Nickles, Eschau/Sommerau (DE)

(73) Assignee: Basell Technology Company BV, Hoofddorp (NL)

( * ) Notice: Subject to any disclaimer, the term of this patent is extended or adjusted under 35 U.S.C. 154(b) by 87 days.

(21) Appl. No.: 09/794,888

(22) Filed: Feb. 26, 2001

(65) Prior Publication Data

US 2002/0013415 A1 Jan. 31, 2002

Related U.S. Application Data

(63) Continuation of application No. 08/851,903, filed on May 6, 1997, now abandoned.

(30) Foreign Application Priority Data

May 6, 1996 (EP) ............................................. 96201238

(51) Int. Cl.$^7$ ............................................. B29D 22/00
(52) U.S. Cl. ..................... 428/35.2; 428/36.8; 428/516; 525/222; 525/240
(58) Field of Search ................................ 525/240, 222; 428/516, 35.2, 36.91

(56) References Cited

U.S. PATENT DOCUMENTS

| | | | |
|---|---|---|---|
| 4,243,619 A | | 1/1981 | Fraser et al. |
| 4,399,054 A | | 8/1983 | Ferraris et al. |
| 4,472,524 A | | 9/1984 | Albizzati |
| 4,473,660 A | | 9/1984 | Albizzati et al. |
| 4,784,885 A | | 11/1988 | Carespodi |
| 4,986,545 A | * | 1/1991 | Sullivan ..................... 473/372 |
| 5,008,332 A | * | 4/1991 | Sano et al. ................ 525/92 D |
| 5,028,649 A | * | 7/1991 | Efner ........................ 524/394 |
| 5,079,281 A | * | 1/1992 | Takeuchi et al. ............ 523/212 |
| 5,115,029 A | * | 5/1992 | Kirkpatrick et al. ........ 525/239 |
| 5,214,084 A | * | 5/1993 | Ishii et al. ..................... 524/96 |
| 5,302,442 A | | 4/1994 | O'Brien et al. |
| 5,352,727 A | * | 10/1994 | Okada ........................ 524/495 |
| 5,451,468 A | | 9/1995 | Seiler et al. |
| 5,716,698 A | | 2/1998 | Schreck et al. |

FOREIGN PATENT DOCUMENTS

| | | |
|---|---|---|
| EP | 0 045 977 | 2/1982 |
| EP | 0 400 333 | 12/1990 |
| EP | 0 472 946 | 3/1992 |
| EP | 0 483 523 | 5/1992 |
| EP | 0 556 815 | 8/1993 |
| EP | 0 560 326 | 9/1993 |
| EP | 0 674 991 | 10/1995 |
| JP | 55-99939 | 7/1980 |
| WO | WO 96/04178 | 2/1996 |

OTHER PUBLICATIONS

Whelan, "Polymer Technology Dictionary", 2$^{nd}$ ed., Chapman & Hall, New York, p. 139 (1994).*

English translation of JP 55–99939 (document B9).

* cited by examiner

Primary Examiner—Bernard Lipman
(74) Attorney, Agent, or Firm—Bryan Cave LLP

(57) ABSTRACT

Polyolefin compositions for seal peel films, comprising (percent by weight):

A) from 20 to 50% of HDPE, LDPE or EVA having MFR higher than 0.3 g/10 min;

B) from 30 to 80% of a random copolymer of propylene with ethylene and/or a $C_4$–$C_8$ α-olefin, or of a polyolefin composition comprising not less than 20% of said random copolymer of propylene;

C) from 0 to 20% of an elastomeric or elastomeric thermoplastic olefin polymer.

6 Claims, No Drawings

POLYOLEFIN COMPOSITIONS FOR HEAT-SEALABLE FILMS HAVING CONTROLLED PEEL STRENGTH

This is a continuation of U.S. application Ser. No. 08/851,903 filed May 6, 1997, now abandoned.

The present invention relates to polyolefin compositions suited for use in the preparation of heat-sealable films having controlled peel strength.

The peel strength, corresponding to the force required for detaching the film in the seal zone when such a film has been heat-sealed to itself or to another substrate (peel force), is a feature capable of determining the value of the heat-sealable films in certain applications.

In fact it is well known that the heat-sealable films used in the packaging field, specially in the food packaging field, must in many cases be detachable along the seals, in order to be removed or to allow opening of the wrap. In such cases the peel strength should correspond to a consumer friendly opening force.

To achieve said effect, heat-sealable films of polyolefin materials have been proposed, generally comprising a support layer and a sealing layer.

Such films are usually called seal peel films.

The support layer is often made of a polyolefin resin, while the sealing layer is made of mixtures of opportunely selected olefin polymers.

The features of the seal, in particular the seal strength, are determined by the choice and the relative amounts of the olefin polymers composing the sealing layer.

In particular, Japanese laid-open patent application No. 63-179741 discloses heat-sealable films wherein the sealing layer comprises a mixture between:

a propylene/ethylene random copolymer and/or propylene/ethylene/butene-1 terpolymer, and a low density and/or linear low density polyethylene.

In the case of the propylene/ethylene/butene-1 terpolymer it is recommended not to exceed 6% by weight of butene, to avoid undesirable effects related to the peelability.

The same limit of 6% by weight as regards the maximum amount of copolymerized $C_4$–$C_{10}$ α-olefin, is found in U.S. Pat. No. 5,451,468.

In fact said patent discloses a heat-sealable film which is also easy to peel, wherein the sealing layer is made of a mixture of:

(I) a random terpolymer of propylene containing from 2% to 6% by weight of ethylene and from 1% to 6% by weight of a $C_4$–$C_{10}$ α-olefin, with (II) at least one ethylene polymer (both homopolymers and copolymers of ethylene being understood by this term).

Therefore in the existing art there is an established teaching that the heat-sealable compositions for multiple layer films to be peeled off after sealing must not contain, in admixture with a polyethylene, random terpolymers of propylene with more than 6% by weight of $C_4$–$C_{10}$ α-olefins, in order to avoid problems when peeling said films.

Moreover in the published European patent application No. 556815 it is shown that when crystalline copolymers of propylene with high amounts of $C_4$–$C_8$ α-olefins (higher than 6% by weight in the examples) are used in admixture with LLDPE as heat-seal material in multilayer films, the Seal Initiation Temperature (S.I.T.) results to be unusually low. In other words, the said European patent application shows that even at very low sealing temperatures the peel strength is increased when crystalline copolymers of propylene with a high content of $C_4$–$C_8$ α-olefin are used in admixture with LLDPE.

Such an effect is obviously beneficial when easy peeling is not desired, as it allows one to obtain sufficiently high peel strength even at very low sealing temperatures but, on the other hand, it makes it difficult to obtain films that can be easily peeled off after sealing.

In fact the Applicant has ascertained by way of experimental tests that, at the sealing temperatures used in the industrial practice, the use of LLDPE in admixture with a random terpolymer of propylene with ethylene and 1-butene, containing about 5% of 1-butene, leads to peel strength values well above 20 N/15 mm (measured with the test method hereinafter described), which is the maximum value usually accepted for films to be peeled off after sealing.

It has now surprisingly been found that peel strength values from about 1 to 20 N/15 mm, which is the range of values usually accepted in the industrial practice for films to be peeled off, are obtained along an unusually broad interval of sealing temperatures by using, for the sealing layer of multilayer films of polymeric materials, in particular polyolefin materials, LDPE, HDPE or EVA in admixutre with (1) random copolymers of propylene with 7% by weight or more of $C_4$–$C_8$ α-olefins, and optionally an elastomeric or elastomeric thermoplastic olefin polymer, or with (2) a propylene-ethylene random copolymer and an elastomeric or elastomeric thermoplastic olefin polymer.

The property of keeping within the said range of peel strength values along a broad interval of sealing temperatures is what is meant by "controlled peel strength". In fact such a property allows one to keep the peel strength under control.

In the absence of said elastomeric or elastomeric thermoplastic polymer, the peel strength values range from about 1 to 4 N/15 mm in the case of films having a total thickness of about 50 μm or less, typical for bioriented (BOPP) films, or from about 4 to 20 N/15 mm in the case of films having greater thickness. In the presence of said elastomeric or elastomeric thermoplastic polymer, the peel strength values are increased, so that they can be higher than 4 N/15 mm also in the case of films having a total thickness of about 50 μm or less.

Therefore the present invention provides polyolefin compositions (I) comprising (percent by weight):

A) from 20 to 50% of LDPE, HDPE or EVA having Melt Flow Rate (MFR) higher than 0.3 g/10 min.;

B) from 50 to 80% of a random copolymer (copolymer B1)) of propylene with a $C_4$–$C_8$ α-olefin, optionally containing from 0.5 to 6% of ethylene as additional comonomer, the amount of $C_4$–$C_8$ α-olefin in the copolymer B1) being from 7 to 40%, preferably from 7 to 30%, more preferably from 8 to 30%, or the same amount (i.e. from 50 to 80%) of a composition comprising a copolymer B1) and, in addition to the copolymer B1), a random copolymer (copolymer B2)) of propylene with ethylene and/or with a $C_4$–$C_8$ α-olefin, containing up to 10% of ethylene when present and from 1 to 6% of said $C_4$–$C_8$ α-olefin when present, or a propylene homopolymer, or a mixture of copolymer B2) and a propylene homopolymer, wherein the relative amount of copolymer B1) with respect to the total weight of the composition B) is not less than 20%, preferably from 25 to 80%;

C) from 0 to 20% of an elastomeric or elastomeric thermoplastic olefin polymer.

The present invention also provides polyolefin compositions (II) comprising (percent by weight):

A) from 20 to 50% of LDPE, HDPE or EVA having a melt flow rate (MFR) higher than 0.3/10 min.;

B) from 30 to 79%, in particular from 30 to 78%, of a random copolymer (copolymer B2)) of propylene with ethylene and optionally with a $C_4$–$C_8$ α-olefin, containing up to 10% of ethylene and from 1 to 6% of said $C_4$–$C_8$ α-olefin when present, or the same amount (i.e. from 30 to 79%, in particular from 30 to 78%) of a composition comprising a copolymer B2) and a propylene homopolymer, wherein the relative amount of copolymer B2) with respect to the total weight of the composition B) is not less than 20%, preferably from 25 to 80%;

C) from 1 to 30%, preferably from 1 to 20%, of an elastomeric or elastomeric thermoplastic olefin polymer, with the proviso that, when it is a copolymer of propylene with a $C_4$–$C_8$ α-olefin, optionally containing from 0.5 to 6% of ethylene as additional comonomer, it contains more than 40%, in particular from 45 to 60% of $C_4$–$C_8$ α-olefin.

As apparent from the above definitions, the term "copolymer" is here used to generally comprise polymers containing two or more kinds of monomers in the polymer chain.

The MFR for LDPE, HDPE and EVA is measured according to the standard ISO 1133 at 190° C./2.16 kg.

An additional and remarkable advantage of the compositions of the present invention is that they allow to obtain the minimum acceptable values of peel strength at remarkably lower sealing temperatures than for the prior-art compositions containing terpolymers of propylene with no more than 6% by weight of $C_4$–$C_{10}$ α-olefins, or copolymers of propylene with ethylene in the absence of the component C).

When the component C) is present in the polyolefin compositions (I), the amount of component A) in said compositions is preferably from 20 to 49% by weight, in particular from 20 to 48% by weight, and the amount of component B) is preferably from 50 to 79% by weight, in particular from 50 to 78% by weight, the lower limit for the amount of C) being preferably of 1% by weight.

Most preferably the polyolefin composition (I) and (II) comprise from 25 to 35% by weight of A).

The most preferred amount of B) is from 65 to 75% when C) is absent (in compositions (I)), or from 50 to 73%, in particular from 50 to 64%, when C) is present (in both compositions (I) and (II)).

The most preferred amount of C) is from 2 to 15% both in compositions (I) and (II).

In the case of compositions (I) it is preferred that, when C) is a copolymer of propylene with a $C_4$–$C_8$ α-olefin, optionally containing from 0.5 to 6% by weight of ethylene as additional comonomer, it contain more than 40%, in particular from 45 to 60% by weight, of $C_4$–$C_8$ α-olefin.

The LDPE (Low Density Polyethylene) to be used as component A) is an ethylene homopolymer or an ethylene copolymer containing minor amounts of other comonomers, like butyl acrylate, prepared by high pressure polymerization using free radical initiators.

The density of said LDPE typically ranges from 0.918 to 0.925 g/cm³, measured according to the standard ISO 1183.

The MFR of said LDPE is preferably from 0.5 to 15 g/10 min., more preferably from 1 to 10 g/10 min.

Such kinds of LDPE are well known in the art and available on the market. Specific examples are the polymers available under the tradenames Escorene and Lupolen.

The HDPE (High Density Polyethylene) to be used as component A) is an ethylene polymer, typically a homopolymer, having a density of 0.94 g/cm³ or more, in particular from 0.94 to 0.96 g/cm³, measured according to the standard ISO 1183. The MFR of said HDPE is preferably from 0.5 to 15 g/10 min., more preferably from 1 to 10 g/10 min.

Such kinds of HDPE are well known in the art and available on the market. Specific examples are the polymers available under the tradenames Hostalen and Finathene.

Among the compositions (II), those containing HDPE as component A) are particularly preferred, as they can withstand high temperatures and can therefore be used for sterilizable packaging applications.

The EVA (Ethylene Vinyl Acetate) copolymer to be used as component A) is a copolymer containing from 2 to 20%, preferably from 4 to 10% by weight of vinylacetate. Such kinds of EVA are well known in the art and available in the market. Specific examples are the polymers available under the tradename Evatane.

The random copolymers B1) and B2) to be used for the component B), are prepared by polymerizing the monomers in the presence of stereospecific Ziegler-Natta catalysts supported on magnesium dihalides. Said catalysts contain, as an essential element, a solid catalyst component comprising a titanium compound having at least one titanium-halogen bond and an electron-donor compound, both supported on a magnesium dihalide.

As co-catalysts an Al-alkyl compound and optionally an electron-donor compound are generally used. The preferred catalysts are characterized in that they are capable of producing polypropylene having an isotactic index higher than 90%, preferably higher than 95%.

Catalysts having the above characteristics are well known in patent literature.

Particularly useful are the catalysts described in U.S. Pat. No. 4,399,054 and European Patent No. 45,977.

Other examples of catalysts are described in U.S. Pat. Nos. 4,472,524 and 4,473,660.

The $C_4$–$C_8$ α-olefin, for both the copolymer B1) and the copolymer B2), is preferably selected from 1-butene; 1-pentene; 1-hexene; 4-methyl-1-pentene; and 1-octene. Particularly preferred is 1-butene.

The amount of ethylene in copolymer B1), when it is present in said copolymer, is preferably from 1 to 4% by weight. The amount of ethylene in copolymer B2) is preferably from 2 to 10% by weight when the $C_4$–$C_8$ α-olefin is not present, and from 0.5 to 5%, more preferably from 1 to 4% by weight, when the $C_4$–$C_8$ α-olefin is present.

When the copolymer B1) alone is used as component B) (i.e. in the absence of the B2) copolymer), more preferably it contains from 8 to 25% by weight of $C_4$–$C_8$ α-olefin, in particular 1-butene, and optionally from 0.5 to 6%, in particular from 1 to 4% by weight, of ethylene.

A preferred example of copolymer B1) is a copolymer containing from 7 to 15% by weight of $C_4$–$C_8$ α-olefin, in particular 1-butene.

The said random copolymers B1) and B2) have generally a melting point, measured with DSC, of 120° C. or more, in particular from 125 to 150° C., and a MFR, measured under the previously said conditions, of 0.5 g/10 min. or more. The compositions of copolymers B1) and B2) to be used as component B) can be obtained by mechanically mixing the said copolymers deriving from separate polymerization processes, or they can be obtained directly in a sequential polymerization process.

Preferred examples of the above said compositions of copolymers to be used as component B) are the compositions comprising (percent by weight):

B1) 30–65%, preferably 35–65%, of a random copolymer of propylene with a $C_4$–$C_8$ α-olefin, containing from 7 to 20%, preferably from 8 to 15% of $C_4$–$C_8$ α-olefin;

B2) 35–70%, preferably 35–65%, of a random copolymer of propylene with ethylene and optionally from 2 to 6% of a $C_4$–$C_8$ α-olefin, said copolymer containing 2 to 10%, preferably 7 to 9% ethylene when the $C_4$–$C_8$ α-olefin is not present, and 0.5 to 5%, preferably 1 to 3% ethylene when the $C_4$–$C_8$ α-olefin is present.

The preferred $C_4$–$C_8$ α-olefin is 1-butene.

Moreover, the above compositions have preferably the following properties:

melting point about 125° to 140° C.; S.I.T. (defined below) 100° to 110° C.; fraction soluble in xylene at 25° C. less than 20%, preferably less than 15%, more preferably less than 10% by weight; fraction soluble in n-hexane at 50° C. less than 5.5% by weight.

The S.I.T., is the minimum seal temperature at which the seal of a multilayered film having at least one layer of polypropylene and one layer of the composition does not break when a 200 g load is applied to the film.

Specific examples of the above said compositions and of the process for preparing them are described in published European patent application No. 483523, reference to which is made for details.

Other preferred examples of compositions of copolymers to be used as component B) are the compositions comprising (percent by weight):

B1) 40–80%, preferably 50–70%, of a random copolymer of propylene with a $C_4$–$C_8$ α-olefin and ethylene, the $C_4$–$C_8$ α-olefin content being 7 to 15%, preferably 8 to 12%, and the ethylene content being 1 to 5%, preferably 2 to 4%;

B2) 20–60%, preferably 30–50%, of a random copolymer of propylene with ethylene, containing 1 to 5%, preferably 2 to 4% of ethylene;

the total content of ethylene in the compositions being 1 to 5%, preferably 2 to 4%, and the total content of $C_4$–$C_8$ α-olefin in the composition being 2.4 to 12%, preferably 3.5 to 8.4%.

The preferred $C_4$–$C_8$ α-olefin is 1-butene.

Moreover, said compositions have preferably the following properties: a melting point from about 126° C. to 147° C.; S.I.T. from 90° to 114° C.; and a fraction soluble in n-hexane at 50° C. of less than 5.5% by weight.

Specific examples of the above said compositions and of the process for preparing them are described in published European patent application No. 674 991, reference to which is made for details.

Other preferred examples of compositions of copolymers to be used as component B) are the compositions comprising (percent by weight):

B1) 40–80%, preferably 50–75%, of a random copolymer of propylene with a $C_4$–$C_8$ α-olefin containing from 15 to 40%, preferably from 20 to 30%, of $C_4$–$C_8$ α-olefin;

B2) 20–60%, preferably 25–50%, of a random copolymer of propylene with a $C_4$–$C_8$ α-olefin, containing from 1 to 6% of $C_4$–$C_8$ α-olefin, same or different from the one present in B1);

where the percent by weight of copolymer B1) (%B1), referred to the total composition, and the percent by weight of $C_4$–$C_8$ α-olefin in copolymer B1) ($C_4^{B1}$) satisfy the following relation:

$$\%B1 \cdot C_4^{B1} \geq 1200.$$

The preferred $C_4$–$C_8$ α-olefin is 1-butene.

Moreover, said compositions have preferably the following properties: a melting point from 135° C. to 150° C.; fraction soluble in xylene at 25° C. of less than 20% by weight; S.I.T. from 90° to 105° C.

Specific examples of the above said compositions and of the process for preparing them are described in published European patent application No. 560 326, reference to which is made for details.

The propylene homopolymer that can be present in the polyolefin compositions (I) and (II) is preferably isotactic polypropylene.

Preferably the elastomeric or elastomeric thermoplastic olefin polymer C) is selected from the group consisting of:

C1) copolymers of propylene with one or more $C_4$–$C_8$ α-olefins and optionally with ethylene as additional comonomer, containing more than 40%, in particular from 45 to 60% by weight of $C_4$–$C_8$ α-olefins and up to 6% by weight of ethylene when present;

C2) copolymers of ethylene with one or more $C_3$–$C_8$ α-olefins containing from 15 to 90% by weight, preferably from 20 to 80% by weight of ethylene and optionally from 1 to 10% by weight of a diene, and containing from 0 to 60%, preferably from 0 to 50% by weight, in particular from 0 to 30% by weight, of a fraction insoluble in xylene at 25° C. (and from 100 to 40%, preferably from 100 to 50%, in particular from 100 to 70% by weight of a fraction totally soluble in xylene at 25° C.);

C3) saturated or unsaturated block copolymers, linear or branched, containing at least one comonomer selected from butadiene, butylene, ethylene and neoprene.

Examples of $C_3$–$C_8$ α-olefins for the copolymers C1) and C2) are propylene; 1-butene; 1-pentene; 1-hexene; 4-methyl-1-pentene and 1-octene.

Copolymers C1) can be prepared by using the same catalysts as for the preparation of component B).

Copolymers C2) can be prepared by using Ziegler-Natta (Ti- or V-based) catalysts or metallocene catalysts.

When prepared with metallocene catalysts, they are generally characterized by a $\overline{Mw/Mn}$ ratio of less than 4, in particular less then 3.

Particularly preferred are the copolymers C2) prepared by using Ziegler-Natta, Ti-based catalysts of the same kind as those used for the preparation of component B) and containing at least 2%, in particular from 4 to 50% by weight, for example from 4 to 30% by weight, of a fraction insoluble in xylene at 25° C. Such fraction insoluble in xylene at 25° C., generally contains 50% by weight or more, in particular from 65 to 95% by weight, of ethylene.

The total content of ethylene in said copolymers C2) is preferably from 20 to 70% by weight. Generally the said fraction insoluble in xylene at 25° C. is an essentially linear copolymer of ethylene with $C_3$–$C_8$ α-olefins.

Specific examples of copolymers C2) prepared with metallocene catalysts are the ethylene/1-octene copolymers Engage 8200 and 8150 (Dow Chemical) and the ethylene/1-butene copolymer Exact 4033 (Exxon Chemical).

Examples of dienes that can be present in copolymers C2) are butadiene, 1,4-hexadiene, 1,5-hexadiene, ethylidene-1-norbornene.

It is particularly preferred to add the C2) copolymers in the form of masterbatch compositions comprising from 30 to 90%, preferably from 40 to 90% by weight of C2), and from 10 to 70%, preferably from 10 to 60% by weight of a propylene homopolymer or a random copolymer of the same kind as the propylene homopolymer or random copolymers of component B). Generally, such masterbatch compositions have a MFR of 0.1 g/10 min. or more. In the examples, the said masterbatch compositions will be indicated with $C^I$).

Such masterbatch compositions can be prepared by a process of sequential polymerization in the presence of the same catalysts as those used for the preparation of component B), said process comprising a polymerization stage of the propylene, or its mixtures with ethylene and/or $C_4$–$C_8$ α-olefins, wherein the propylene homopolymer or random copolymer is formed, and one or more stages of polymerization of ethylene with one or more $C_3$–$C_8$ α-olefins and optionally a diene, wherein the copolymer C2) is formed.

Specific examples of the said compositions to be used as masterbatches according to the present invention and of the process for preparing them are described in published European Patent Applications No. 400 333 and No. 472 946, reference to which is made for details.

Other examples of copolymers C2) are the so called EPR and EPDM rubbers.

Examples of copolymers C3) are the styrene-isoprene-styrene block copolymers (SIS), like Kraton D-1-112, and styrene-ethylene-butylene-styrene block copolymers (SEBS) like Kraton G-1652 (Shell).

The polyolefin compositions of the present invention can be prepared by mixing together the above said components (A), (B) and (C) in the molten or softened state by using well known apparatuses for mixing and extruding polymers, like single or twin screw extruders.

As previously said, the heat-sealable packaging films to be peeled off after sealing comprise at least one sealing layer composed of or comprising the compositions of the present invention and at least one support layer composed of or comprising a polymeric material, in particular a polyolefin material.

In particular, the support layer or layers can be composed of or comprise one or more polymers or copolymers, or their mixtures, of R—CH=$CH_2$ olefins where R is a hydrogen atom or a $C_1$–$C_6$ alkyl radical. Particularly preferred are the following polymers:

1) isotactic or mainly isotactic propylene homopolymers;
2) random copolymers of propylene with ethylene and/or $C_4$–$C_8$ α-olefins, such as for example 1-butene, 1-hexene, 1-octene, 4-methyl-1-pentene, wherein the total comonomer content ranges from 0.05% to 20% by weight, or mixtures of said copolymers with isotactic or mainly isotactic propylene homopolymers;
3) heterophasic copolymers comprising (a) a propylene homopolymer and/or one of the copolymers of item 2), and an elastomeric fraction (b) comprising copolymers of ethylene with propylene and/or a $C_4$–$C_8$ alpha-olefin, optionally containing minor amounts of a diene, such as butadiene, 1,4-hexadiene, 1,5-hexadiene, ethylidene-1-norbornene.

Preferably the amount of diene in (b) is from 1% to 10% by weight.

The heterophasic copolymers (3) are prepared according to known methods by mixing the components in the molten state, or by sequential copolymerization, and generally contain the copolymer fraction (b) in amounts ranging from 5% to 80% by weight.

Other olefin polymers employable for the support layers are HDPE, LDPE and LLDPE polyethylenes.

Examples of polymeric materials different from polyolefins, employable for the support layers, are polystyrenes, polyvinylchloride, polyamides, polyesters and polycarbonates. Both the support layers and the layers of the heat-sealable compositions of the present invention may comprise additives commonly employed in the art, like stabilizers, pigments, fillers, nucleating agents, slip agents, lubricant and antistatic agents, flame retardants, plasticizers and biocidal agents.

Preferred structures for said films are of A/B type and A/B/A type, where A is the layer of heat-sealing composition according to the present invention and B is the support layer.

Independently from the structure of the film, for the BOPP films the thickness of the layers of heat-sealing composition according to the present invention is preferably from 1 to 5 μm, more preferably from 1 to 3 μm, while the thickness of the support layers is preferably from 15 to 45 μm, more preferably from 15 to 25 μm.

For films having greater thickness, as for instance cast films, the thickness of the layers of the heat-sealing composition according to the present invention is preferably from 10 to 100 μm, more preferably from 25 to 50 μm, while the thickness of the support layers is preferably from 80 to 500 μm.

The said packaging films are produced by using processes well known in the art.

In particular, extrusion processes can be used.

In said extrusion processes the polymer materials to be used for the heat-sealing layers and those to be used for the support layers are molten in different extruders and extruded through a narrow slit.

The extruded molten material is pulled away from the slit and cooled before winding-up.

Specific examples of extrusion processes are the blown film, cast film and BOPP processes hereinbelow explained.

Blown Film

The molten polymer materials are forced through a circular shaped slit.

The extrudate which is drawn off has the shape of a tube, which is inflated by air to form a tubular bubble. The bubble is cooled and collapsed before winding-up.

Cast Film

The molten polymer materials are forced through a long, thin, rectangular shaped slit. The extrudate has the shape of a thin film. The film is cooled before winding-up.

BOPP

The molten polymer materials are forced continuously through a narrow slit. The extruded molten material is pulled away from the slit and cooled, then heated again and stretched both in the Machine Direction (MD) and in the Transverse Direction (TD). After the stretching process, the film is cooled and then wound-up.

Other useable processes are the extrusion coating and lamination processes hereinbelow explained.

Extrusion Coating

The heat-sealing layer is coated to a support web. Coating is effected with a melt film which is molten in different extruders and extruded via a slit die and may consist of one or more polymer layers. The resulting laminate is then cooled and wound-up.

Lamination

The heat-sealing layer and the support layer are laminated together by means of heat, after which cooling and winding up are carried out. The sealing layer can also be laminated to the support layer by a glue, after which cooling and winding-up are carried out.

The following examples are given to illustrate, not to limit, the present invention.

EXAMPLE 1

A 2-layer film of 320 μm is produced by cast film extrusion on a coextrusion line.

The main extruder is filled with the polymer to be used for the support layer (support polymer) and the co-extruder with the heat-sealable polyolefin composition.

The support polymer is a copolymer of propylene with 6.6% by weight of ethylene, having MFR of 2 g/10 min. at 230° C. and 2.16 kg according to ISO 1133.

The heat-sealable polyolefin composition is obtained by mixing in the molten state in an extruder the following components (percent by weight):

A) 30% of LDPE homopolymer having a density of 0.923 according to ISO 1183 and a MFR of 4 g/10 min.,
B) 70% of a composition containing:
    B1) 65% of a random copolymer of propylene with 9% of 1-butene and 3.5% of ethylene;
    B2) 35% of a random copolymer of propylene with 3.5% of ethylene.

The composition B) has been prepared by a sequential polymerization process in the presence of a stereospecific Ziegler-Natta catalyst supported on magnesium dichloride and has MFR of 5 g/10 min. at 230° C. and 2.16 kg according to ISO 1133.

The polymers are molten in the main and co-extruder. The melt streams emerging from both extruders are combined via an adapter system, applied one on top of the other in the form of layers and extruded via a slit die. A 2-layer film is obtained which is cooled with an airknife and then collected on rolls. The support layer has a thickness of 290 μm. The extrusion processing conditions are the following:

| Main extruder | screw diameter: | 80 mm |
| | speed melt pump: | 45.1 rpm |
| | screw speed: | 54.1 rpm |
| Co-extruder | screw diameter: | 45 mm |
| | screw speed: | 61.1 rpm |
| Output: | | 89 kg/h |
| Die width: | | 0.4–1 mm |
| Temperature settings main extruder: | zone 1: | 190° C. |
| | zone 2: | 200° C. |
| | zone 3–13: | 200° C. |
| Temperature settings co-extruder: | zone 1: | 180° C. |
| | zone 2: | 200° C. |
| | zone 3: | 220° C. |
| | zone 4–6: | 230° C. |
| Temperature settings die: | | 220–230° C. |
| Roll temperatures: | roll 2: | 60° C. |
| | roll 3: | 50° C. |
| Roll speed: | roll 1: | 12.65 m/min. |
| | roll 2: | 12.65 m/min. |
| | roll 3: | 12.65 m/min. | on the so obtained film a seal/peel test is carried out according to the following procedure.

1. Sealing

The film to be tested is cut (MD direction) to samples having a width of 150 mm and a length of 200 mm.

Pieces of a 400 μm thick film of the same polymer used for the support layer are cut in the same dimensions, thereby obtaining substrate pieces.

Both the samples of films to be tested and the substrate pieces are put between the sealing bars of a KOPP SPGE 20 laboratory sealing machine, with the samples on the top.

The upper sealing bar is heated up to the sealing temperature. The sealing bars are closed for 1 second under a pressure of 1.6 bar and seals are produced (100 mm length, 10 mm weld overlap) in the TD direction.

The temperatures at which the samples are sealed to the substrate pieces are reported in Table 1.

2. Peel Test

After conditioning the sealed samples for 24 hours at 23° C., the peel strength is tested with an Instron machine.

The samples and the substrate pieces to which they are sealed are first cut to test samples having a width of 15 mm and are then clamped between grips with a grip distance of 50 mm.

The force needed to pull open the seal with a constant speed of 50 mm/min. is recorded.

Such force, expressed in N/15 mm, corresponds to the peel strength and is reported, for each sample, in Table 1.

Comparative Example 1

The same procedure and testing conditions as in Example 1 are used, with the only difference that for the heat-sealable composition 70% by weight of a random copolymer of propylene with 6% by weight of ethylene is used as the component B) in admixture with 30% by weight of the same component A) as in Example 1.

The MFR of said random copolymer of propylene with ethylene, measured according to ISO 1133 at 230° C. and 2.16 kg, is of 7.5 g/10 min.

The sealing temperatures and the corresponding Peel Test results are reported in Table 1.

TABLE 1

| Seal Temperature (° C.) | Peel force for the samples of Example 1 (N/15 mm) | Peel force for the samples of Comp. Example 1 (N/15 mm) |
| --- | --- | --- |
| 210 | 2 | — |
| 220 | 3 | — |
| 230 | 4 | — |
| 240 | 5 | 1 |
| 250 | 5 | 5 |
| 260 | 7 | 6 |
| 270 | 8 | 7 |
| 280 | 8 | 7 |
| 290 | — | 8 |
| 300 | — | 8 |

The results reported in Table 1 show that the polyolefin compositions of the present invention (Example 1) can be sealed at significantly lower temperatures with respect to prior-art compositions containing a random copolymer of propylene with ethylene in admixture with LDPE (Comparative Example 1).

In addition, the polyolefin compositions of the present invention display a moderate increase of the peel strength along a wide interval of seal temperatures, thereby providing an unusually broad operational window.

EXAMPLE 2

A 2-layer film is obtained by operating under the same conditions as in Example 1, but using a heat-sealable polyolefin composition obtained by mixing in the molten state in an extruder the following components (percent by weight):

A) 30% of the same LDPE as in Example 1;
B) 60% of the same composition as the composition B) of Example 1;
C′) 10% of a masterbatch composition having a MFR of 6 g/10 min. and containing:
    50% of a random copolymer of propylene with ethylene, containing about 3.2% of ethylene;
    50% of an elastomeric copolymer of propylene with ethylene, containing about 28% of ethylene.

The elastomeric copolymer in the masterbatch composition C′) contains 6% by weight of a fraction insoluble in xylene at 25° C., consisting of an ethylene-propylene copolymer containing about 80% of ethylene, and 94% by weight of an ethylene-propylene copolymer totally soluble in xylene at 25° C., containing about 25% of ethylene.

The peel forces measured on the film so obtained are increased with respect to the peel force values reported in Table 1 for Example 1.

Namely, the average peel force is of 8 N/15 min, measured under the same test conditions as in Example 1.

EXAMPLE 3

A 3-layer film of 50 μm is produced by the blown film technique on a coextrusion line.

The main extruder is filled with the polymer to be used for the support layer (support polymer) and the two side extruders with the heat-sealable polyolefin composition.

The support polymer is the same as in Example 1.

The heat-sealable polyolefin composition is obtained by mixing in the molten state in an extruder the following components (percent by weight unless differently specified):

A) 30% of an ethylene homopolymer (HDPE) having a density of 0.94 g/cm$^3$ according to ISO 1183 and a MFR of 11 g/10 min;

B) 60% of a random copolymer of propylene with ethylene containing 3.5% of ethylene and having a MFR of 18 g/10 min.;

C$^I$) 10% of the same masterbatch composition as the composition C$^I$) in Example 2.

The Extrusion conditions are the following:
Main extruder: screw diameter: 90 mm
Side extruders: screw diameter: 65 mm
Total output: 215 kg/h
Total film thickness: 50 μm
Thickness distribution: 5/40/5 μm
Die opening: 1 mm
Blow up ratio: 3
Temperature settings: temperature was set at 230° C. for all zones of the extruder including the die head.

The above reported thickness distribution means that the film comprises a support layer having a thickness of 40 μm and two external sealing layers of the said heat sealable composition, having a thickness of 5 μm each.

On the so obtained film a seal/peel test is carried out according to the following procedure.

1. Sealing

The film to be tested is cut (MD direction) to samples having a width of 150 mm and a length of 200 mm.

The samples to be tested are put between the sealing bars of a KOPP SPGE 20 laboratory sealing machine, and sealing layer is sealed against sealing layer.

Both sealing bars are heated at equal sealing temperatures. The sealing bars are closed for 0.5 second under a pressure of 3 bar and seals are produced (100 mm length, 10 mm weld overlap) in the TD direction.

The temperatures at which the samples are sealed are reported in Table 2.

2. Peel Test

The test conditions are the same as in Example 1, except that the testing speed is 100 mm/min. The resulting peel force values are reported in Table 2.

EXAMPLE 4

A 3-layer film is obtained by operating under the same conditions as in Example 3, but using a heat sealable composition obtained by mixing in the molten state in an extruder the following components (percent by weight):

A) 30% of the same HDPE as in Example 3;

B) 60% of the same random copolymer of propylene with ethylene as in Example 3;

C$^I$) 10% of a masterbatch composition having a MFR of 0.6 g/10 min. and containing:

36% of a random copolymer of propylene with ethylene, containing about 3.2% of ethylene;

64% of an elastomeric copolymer of propylene with ethylene, containing about 28% of ethylene.

The elastomeric copolymer in the masterbatch composition C$^I$) contains 6% by weight of a fraction insoluble in xylene at 25° C., consisting of an ethylene-propylene copolymer containing about 80% of ethylene, and 94% by weight of an ethylene-propylene copolymer totally soluble in xylene at 25° C., containing about 25% of ethylene.

The peel force values measured on the so obtained film under the same test conditions as in Example 3, are reported in Table 2.

Comparative Example 2

A 3-layer film is obtained by operating under the same conditions as in Example 3, but using a heat sealable composition obtained by mixing in the molten state in an extruder the following components (percent by weight):

A) 30% of the same HDPE as in Example 3;

B) 70% of the same random copolymer of propylene with ethylene as in Example 3;

The peel force values measured on the so obtained film under the same test conditions as in Example 3, are reported in Table 2.

TABLE 2

| Seal Temperature (° C.) | Peel force Ex. 3 (N/15 mm) | Peel force Ex. 4 (N/15 mm) | Peel force Comp. Ex. 2 (N/15 mm) |
| --- | --- | --- | --- |
| 130 | 3.5 | 6.5 | 1.5 |
| 135 | 5.0 | 7.0 | 2.0 |
| 140 | 7.0 | 9.0 | 3.2 |
| 145 | 7.5 | 9.0 | 3.4 |
| 150 | 8.0 | 9.9 | 4.0 |

Note 1
The masterbatch compositions C$^I$) used in the examples are prepared by a sequential polymerization process in the presence of a stereospecific Ziegler-Natta catalyst supported on magnesium dichloride.

Note 2
DETERMINING THE PERCENTAGE OF THE FRACTION INSOLUBLE IN XYLENE 2.5 g of polymer are dissolved in 250 ml of xylene at 135° C. under agitation. After 20 minutes the solution is cooled to 25° C., with agitation, and then it is allowed to settle for 30 minutes. The precipitate is filtered with filter paper; the solution is evaporated under a nitrogen current, and the residue dried under vacuum at 80° C. until reaches constant weight. The weight percentage of the fraction insoluble in xylene at 25° C. is then calculated.

The precipitate is filtered with filter paper; the solution is evaporated under a nitrogen current, and the residue dried under vacuum at 80° C. until reaches constant weight. The weight percentage of the fraction insoluble in xylene at 25° C. is then calculated.

What is claimed is:

1. A multilayer film for packaging having a peel strength values from about 1 to 20 N/15 mm, comprising at least one sealing layer comprising a polyolefin composition consisting essentially of:

20–50% by weight (A),

50–80% by weight (B), and

1–20% by weight (C), wherein (A) is a low-density polyethylene (LDPE), high-density polyethylene (HDPE) or ethylene-vinylacetate copolymer (EVA) having a Melt Flow Rate (MFR) higher than 0.3 g/10 min;

(B) is a composition selected from the group consisting of:

(i) B1, a random copolymer of propylene with 7 to 40% by weight of a $CH_2=CHR$ alkene, where R is an alkyl group containing from 2 to 6 carbon atoms, and from 0.5 to 6% by weight of ethylene as additional comonomer;
(ii) a composition comprising (a) at least 20% by weight B1, and (b) B2, a random copolymer of propylene with up to 10% by weight of ethylene;
(iii) a composition comprising (a) at least 20% by weight B1; and (b) a propylene homopolymer; and
(iv) a composition comprising (a) at least 20% by weight B1; (b) B2, and (c) a propylene homopolymer, and (C) is a copolymer selected from the group consisting of:
(C1) copolymers of propylene with 45–60% by weight of one or more $CH_2$=CHR alkenes, where R is an alkyl group containing 2 to 6 carbon atoms, or copolymers of propylene with 45–60% by weight of the one or more $CH_2$=CHR alkenes and with 0 to 6% by weight ethylene;
(C2) copolymers of 20 to 80% by weight ethylene with one or more $CH_2$=CHR' alkenes, where R' is an alkyl group containing from 1 to 6 carbon atoms, the copolymers of ethylene containing from 0 to 30% of fraction insoluble in xylene at 25° C., or copolymers of 20 to 80% by weight ethylene with one or more of the $CH_2$=CHR' alkenes and from 1 to 10% by weight of a diene, the copolymers of ethylene containing from 0 to 30% by weight of a fraction insoluble in xylene at 25° C.; and
(23) saturated or unsaturated block copolymers, linear or branched, containing at least one comonomer selected from the group consisting of butadiene, butene, ethylene, and neoprene.

2. The polyolefin compositions of claim 1, wherein the MFR of component (A) is from 0.5 to 15 g/10 min, component (A) is present in an amount from 20–49% by weight, component (B) is present in an amount from 50–79% by weight, and component B2 contains from 2 to 10% by weight of ethylene.

3. A multilayer film according to claim 1, wherein the polyolefin composition consists essentially of:
25–35% by weight (A),
50–73% by weight (B), and
2–15% by weight (C),
wherein
(A) is LDPE, HDPE, or EVA having an MFR from 0.5 to 15 g/10 min;
(B) is a random copolymer of propylene having 7 to 25% by weight of $CH_2$=CHR alkenes, and 0.5 to 6% by weight of ethylene; and
(C) is a copolymer selected from the group consisting of:
(C1) copolymers of propylene with 45–60% by weight of one or more $CH_2$=CHR alkenes, where R is an alkyl group containing from 2 to 6 carbon atoms, or copolymers of propylene with 45–60% by weight of the one or more $CH_2$=CHR alkenes and with 0.5 to 6% by weight ethylene;
(C2) copolymers of 20 to 80% by weight ethylene with one or more $CH_2$=CHR' alkenes, where R' is an alkyl group containing from 1 to 6 carbon atoms, the copolymers of ethylene containing from 0 to 30% of a fraction insoluble in xylene at 25° C., or copolymers of 20 to 80% by weight ethylene with one or more of the $CH_2$=CHR' alkenes and from 1 to 10% by weight of a diene, the copolymers of ethylene containing from 0 to 30% by weight of a fraction insoluble in xylene at 25° C.; and (C3) saturated or unsaturated block copolymers, linear or branched, containing at least one comonomer selected from the group consisting of butadiene, butene, ethylene, and neoprene.

4. A multilayer film according to claim 1, wherein the polyolefin composition consists essentially of:
25–35% by weight (A),
50–73% by weight (B), and
2–15% by weight (C),
wherein
(A) is LDPE, HDPE, or EVA having an MFR from 0.5 to 15 g/10 min;
(B) is a composition consisting essentially of:
30 to 65% by weight (B1) and
35–70% by weight (B2)
wherein
(B1) is a random copolymer of propylene with 7 to 20% by weight $CH_2$=CHR alkenes and 0.5 to 6% by weight of ethylene; and
(B2) is a random copolymer of propylene with 2 to 10% by weight ethylene; and
(C) is a copolymer selected from the group consisting of:
(C1) copolymers of propylene with 45–60% by weight of one or more $CH_2$=CHR alkenes, where R is an alkyl group containing from 2 to 6 carbon atoms, or copolymers of propylene with 45–60% by weight of the one or more $CH_2$=CHR alkenes and with 0.5 to 6% by weight ethylene;
(C2) copolymers of 20 to 80% by weight ethylene with one or more $CH_2$=CHR' alkenes, where R' is an alkyl group containing from 1 to 6 carbon atoms, the copolymers of ethylene containing from 0 to 30% of a fraction insoluble in xylene at 25° C., or copolymers of 20 to 80% by weight ethylene with one or more of the $CH_2$=CHR' alkenes and from 1 to 10% by weight of a diene, the copolymers of ethylene containing from 0 to 30% by weight of a fraction insoluble in xylene at 25° C.; and
(C3) saturated or unsaturated block copolymers, linear or branched, containing at least one comonomer selected from the group consisting of butadiene, butene, ethylene, and neoprene.

5. A multilayer film according to claim 1, wherein the polyolefin composition consists essentially of:
25–35% by weight (A),
50–80% by weight (B), and
2–15% by weight (C),
wherein
(A) is LDPE, HDPE, or EVA having an MFR from 0.5 to 15 g/10 min;
(B) is a composition consisting essentially of:
40 to 80% by weight (B1) and
20–60% by weight (B2)
wherein
(B1) is a random copolymer of propylene with 7 to 15% by weight $CH_2$=CHR alkenes and 1 to 5% by weight of ethylene;
(B2) is a random copolymer of propylene with 2 to 4% by weight ethylene; and the total content of ethylene in the composition (B) is 1 to 5% by weight and the total content of the $CH_2$=CHR alkenes in the composition (B) is 2.4 to 12% by weight; and
(C) is a copolymer selected from the group consisting of:
(C1) copolymers of propylene with 45–60% by weight of one or more $CH_2$=CHR alkenes, where R is an alkyl group containing from 2 to 6 carbon atoms, or copolymers of propylene with 45–60% by weight of the one or more $CH_2$=CHR alkenes and with 0.5 to 6% by weight ethylene;

(C2) copolymers of 20 to 80% by weight ethylene with one or more $CH_2$=CHR' alkenes, where R' is an alkyl group containing from 1 to 6 carbon atoms, the copolymers of ethylene containing from 0 to 30% of a fraction insoluble in xylene at 25° C., or copolymers of 20 to 80% by weight ethylene with one or more of the $CH_2$=CHR' alkenes and from 1 to 10% by weight of a diene, the copolymers of ethylene containing from 0 to 30% by weight of a fraction insoluble in xylene at 25° C.; and (C3) saturated or unsaturated block copolymers, linear or branched, containing at least one comonomer selected from the group consisting of butadiene, butene, ethylene, and neoprene.

6. A multilayer film according to claim 1, wherein the polyolefin composition consists essentially of:

25–35% by weight (A),

50–73% by weight (B), and

2–15% by weight (C), wherein (A) is LDPE, HDPE, or EVA having an MER from 0.5 to 15 g/10 min;

(B) is a composition consisting essentially of:

40 to 80% by weight (B1) and

20–60% by weight (B2)

wherein (B1) is a random copolymer of propylene with 7 to 15% by weight $CH_2$=CHR alkenes and 2 to 4% by weight of ethylene;

(B2) is a random copolymer of propylene with 2 to 4% by weight ethylene; and the total content of ethylene in the composition (B) is 2 to 4% by weight and the total content of the $CH_2$=CHR alkenes in the composition (B) is 3.5 to 8.4% by weight; and (C) is a copolymer selected from the group consisting of:

(C1) copolymers of propylene with 45–60% or by weight of one or more $CH_2$=CHR alkenes, where R is an alkyl group containing from 2 to 6 carbon atoms, or copolymers of propylene with 45–60% by weight of the one or more $CH_2$=CHR alkenes and with 0.5 to 6% by weight ethylene;

(C2) copolymers of 20 to 70% by weight ethylene with one or more $CH_2$=CHR' alkenes, where R' is an alkyl group containing from 1 to 6 carbon atoms, the copolymers of ethylene containing from 4 to 30% of a fraction insoluble in xylene at 25° C., or copolymers of 20 to 80% by weight ethylene with one or more of the $CH_2$=CHR' alkenes and from 1 to 10% by weight of a diene, the copolymers of ethylene containing from 4 to 30% by weight of a fraction insoluble in xylene at 25° C., the fraction insoluble in xylene containing from 20 to 70% by weight of ethylene; and (C3) saturated or unsaturated block copolymers, linear or branched, containing at least one comonomer selected from the group consisting of butadiene, butene, ethylene, and neoprene.

* * * * *

UNITED STATES PATENT AND TRADEMARK OFFICE
CERTIFICATE OF CORRECTION

PATENT NO. : 6,849,313 B2
DATED : February 1, 2005
INVENTOR(S) : Martine Mechelaere and Ralf Nickles It is certified that error appears in the above-identified patent and that said Letters Patent is hereby corrected as shown below:

Title page,
Item [75], Inventors, please change "Bruges" to -- Brugge --.

Column 13,
Line 22, after "of", please insert -- a --.

Column 15,
Line 25, please change "MER" to -- MFR --.

Column 16,
Line 7, please delete "or".

Signed and Sealed this

Eighth Day of November, 2005

JON W. DUDAS
*Director of the United States Patent and Trademark Office*